(12) United States Patent
Shah

(10) Patent No.: US 7,457,608 B2
(45) Date of Patent: Nov. 25, 2008

(54) SHARING OF WIRELESS TELEPHONE SERVICES FOR A PERSONAL WIRELESS TELEPHONE AND A VEHICULAR WIRELESS TELEPHONE

(75) Inventor: Hitesh Shah, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 279 days.

(21) Appl. No.: 09/971,080

(22) Filed: Oct. 3, 2001

(65) Prior Publication Data

US 2002/0068543 A1    Jun. 6, 2002

Related U.S. Application Data

(63) Continuation-in-part of application No. 60/691,800, filed on Oct. 19, 2000, now abandoned.

(60) Provisional application No. 60/237,439, filed on Oct. 3, 2000.

(51) Int. Cl.
*H04B 1/08* (2006.01)
*H04M 11/00* (2006.01)
*H04Q 7/20* (2006.01)
*H04M 1/00* (2006.01)

(52) U.S. Cl. .................. 455/351; 455/406; 455/433; 455/569.2

(58) Field of Classification Search ......... 455/405–411, 455/462, 463, 11.1, 518–519, 554.1–555, 455/569.2; 370/310, 310.1, 314, 315, 319–321; 379/88.25, 88.26
See application file for complete search history.

(56) References Cited

U.S. PATENT DOCUMENTS

| 5,732,074 | A |   | 3/1998  | Spaur |
|-----------|---|---|---------|-------|
| 5,818,918 | A | * | 10/1998 | Fujii ..................... 379/167.01 |
| 5,943,620 | A | * | 8/1999  | Boltz et al. ................. 455/445 |
| 6,047,051 | A | * | 4/2000  | Ginzboorg et al. .......... 379/130 |
| 6,064,666 | A |   | 5/2000  | Willner et al. |
| 6,246,755 | B1| * | 6/2001  | Walker et al. ............ 379/114.2 |

(Continued)

FOREIGN PATENT DOCUMENTS

| EP | 1 014 338 A2 | 6/2000 |
|----|--------------|--------|
| EP | 0 482 503 A2 | 4/2002 |
| GB | 2 241 850 A  | 9/1991 |
| WO | WO 98/57824  | 12/1998 |

*Primary Examiner*—Duc Nguyen
*Assistant Examiner*—Michael T Thier
(74) *Attorney, Agent, or Firm*—Zagorin O'Brien Graham LLP

(57) ABSTRACT

Sharing of wireless telephone services between a subscriber's personal wireless telephone and the subscriber's vehicular wireless telephone. The shared service may be a connectivity service, allowing the subscriber's personal wireless telephone to communicate directly with the subscriber's vehicular wireless telephone. Alternately, or additionally, the shared service may be one or more services provided for by the wireless service agreement plan of the subscriber's vehicular wireless telephone or the subscriber's personal wireless telephone.

16 Claims, 7 Drawing Sheets

U.S. PATENT DOCUMENTS

| | | |
|---|---|---|
| 6,266,401 B1 * | 7/2001 | Marchbanks et al. ........ 379/116 |
| 6,542,758 B1 * | 4/2003 | Chennakeshu et al. ... 455/569.2 |
| 6,564,056 B1 * | 5/2003 | Fitzgerald ................... 340/5.1 |
| 6,633,757 B1 * | 10/2003 | Hermann et al. ......... 455/414.1 |
| 6,675,007 B2 * | 1/2004 | Tamaki et al. ............... 455/406 |
| 6,754,485 B1 * | 6/2004 | Obradovich et al. ..... 455/414.1 |
| 6,757,262 B1 * | 6/2004 | Weisshaar et al. ........... 370/310 |
| 2002/0028655 A1 * | 3/2002 | Rosener et al. ............... 455/16 |

* cited by examiner

SHARING OF WIRELESS TELEPHONE SERVICES FOR A PERSONAL WIRELESS TELEPHONE AND A VEHICULAR WIRELESS TELEPHONE

This application (1) claims priority to provisional U.S. Application No. 60/237,439, entitled "Revenue Share Of Feature Service For Handset Integration," filed Oct. 3, 2000, which provisional application is incorporated entirely herein by reference and (2) is a continuation-in-part of U.S. patent application Ser. No. 09/691,800, entitled "A Method Of Sharing Revenue For Transmission Of Wireless Data From A Vehicle," filed Oct. 19, 2000 now abandoned, and naming Hitesh Shah as inventor, which application is incorporated entirely herein by reference.

FIELD OF THE INVENTION

The present invention relates to sharing wireless telephone service between a subscriber's personal wireless telephone and a wireless telephone integrated into the subscriber's vehicle. In particular, the invention relates to a method and system where a subscriber employs a connectivity service that allows a subscriber's personal wireless telephone to convey data to or receive data from a wireless telephone integrated into the subscriber's vehicle.

The invention also relates to a method and system that allow a subscriber's personal wireless telephone and vehicular telephone to share some or all of the features or services of a wireless service plan. Still further, the invention relates to a method and system where the services provided for a subscriber's personal wireless telephone and vehicular wireless telephone are joined into a single billing account. Additionally, the invention relates to a method and system that allow a wireless service provider to generate revenue by providing the connectivity service or by sharing services or features between a subscriber's personal wireless telephone and the subscriber's vehicular wireless telephone.

BACKGROUND OF THE INVENTION

Wireless telephones have become ubiquitous in society, and many people use wireless telephones for a variety of functions. For example, people of all ages commonly use personal wireless telephones. As is well known in the art, this type of wireless telephone is hand-held, and allows the user to both send and receive wireless telephone calls to and from different destinations. Wireless telephone calls may include analog signals, such as analog voice transmissions, digital signals, such as binary data encapsulated according to the Transmission Control Protocol (TCP), the Internet protocol (IP), the User Datagram Protocol (UDP), or any other suitable protocol or combination of protocols, or a combination of analog and digital signals.

As is also well-known, wireless service carriers, such as AT&T Wireless Service, Inc., provide the infrastructure for wireless communication with this type of wireless telephone. For example, a wireless service carrier will monitor the location of a personal wireless telephone, and route calls for that wireless telephone to the cellular radio tower in that telephone's service area. Similarly, the wireless service carrier will monitor calls from that wireless telephone, and route these calls to their proper wireless telephone network or Public Switched Telephone Network (PSTN) destination.

With many personal wireless telephones, the telephone's wireless service carrier commonly also acts as the telephone's wireless service provider. That is, the wireless service carrier may also be the entity that determines which communication services are available to the wireless telephone, and the costs of these services. Conventionally, a wireless service provider authorizes a personal wireless telephone to receive wireless communication or concierge services according to an agreement, commonly referred to as a wireless service plan, with the telephone's owner (referred to hereafter as the telephone's subscriber). The wireless service plan defines both the services that will be provided to the personal wireless telephone, and the fees that the wireless service provider will charge the telephone's subscriber for providing those services.

For example, a wireless service plan may designate that a wireless service provider will provide a personal wireless telephone with 100 minutes of local wireless and PSTN telephone communication each month for a flat monthly fee of $50, and will provide additional local wireless telephone and PSTN communication at a rate of $1 per minute for every minute thereafter. The wireless service plan may also specify that the subscriber's personal wireless telephone will receive voice mail service for a fee of $10 per month and an incoming caller identification service for an additional $10 per month. If a subscriber subsequently wishes to change the services provided to his or her personal wireless telephone, the subscriber arranges for the change through the wireless service provider.

Vehicle manufacturers also are including wireless telephones in new vehicles. These wireless telephones are not simply personal wireless telephones mounted into a vehicle. Instead, these wireless telephones, hereafter referred to as vehicular wireless telephones, are wireless communication units integrated into the electrical control system of the vehicle. Thus, these vehicular telephones can be used to monitor information related to the vehicle itself, such as the vehicle's engine operating condition and the precise location of the vehicle. These vehicular telephones may even be used to control the operation of the vehicle. For example, some vehicular telephones can unlock a vehicle's doors, honk the vehicle's horn, and even flash the vehicle's lights.

Of course, in addition to providing communication services directly related to the operation of the vehicle, vehicular telephones may also be used to perform other functions or to receive other services. For example, with some vehicular telephones, the vehicle's driver may employ the vehicular wireless telephone to obtain concierge services, such as navigation directions, arranging for reservations with restaurants and airlines, requesting roadside assistance. The vehicular telephone may also receive (and even display) image data, such as data transmitted according to the TCP/IP protocol (e.g., Web pages written in a markup language, such as the Hypertext Markup Language (HTML)) or data encoded according to a Moving Pictures Experts Group (MPEG) standard, or other types of data, such as Voice Extensible Markup Language (XML) data.

Like personal wireless telephones, wireless service carriers provide wireless communication for the vehicular wireless telephones. Unlike personal wireless telephones, however, the wireless service provider who authorizes services for a vehicular wireless telephone is usually different than the wireless service carrier that provides communication for the vehicular wireless telephone. That is, the wireless service provider typically is an entity associated with the vehicle, such as the vehicle's manufacturer or an organization affiliated with the vehicle's manufacturer (e.g., a subsidiary of the vehicle's manufacturer), rather than a wireless service carrier.

With this arrangement, the vehicular wireless telephone's subscriber may have no contact with the wireless service carrier actually used by the vehicular wireless telephone to communicate. Instead, the subscriber may deal only with the wireless service provider that determines the services offered to the vehicular wireless telephone. The vehicle's subscriber may thus enter into a wireless service plan with the wireless service provider, rather than with the wireless service carrier that will actually provide wireless communication for the vehicular wireless telephone.

While both personal wireless telephones and vehicular wireless telephones offer their subscriber's a variety of features, the current operation of these wireless telephones present a number of limitations for users who subscribe to both personal wireless telephone service and vehicular wireless telephone service. For example, with conventional vehicular wireless telephones, a subscriber's personal wireless telephone cannot communicate with the subscriber's vehicular wireless telephone. Thus, with conventional vehicular telephones, a subscriber cannot exchange information (e.g., stored telephone numbers) between the subscriber's personal wireless telephone and the subscriber's vehicular wireless telephone, or call his or her vehicular wireless telephone from his or her personal wireless telephone. Further, a subscriber cannot have information intended for the subscriber's personal wireless telephone relayed to his or her vehicular wireless telephone, or vice versa.

In addition, while a subscriber's service plan for a vehicular wireless telephone may offer the subscriber a number of beneficial services (e.g., travel directions or concierge services), the subscriber can only enjoy easy access to these services from the vehicular telephone. If a subscriber tries to obtain these services from his or her personal wireless telephone, the subscriber usually must provide a personal identification code or other data to identify the subscriber.

Further, a subscriber must typically pay two separate subscription fees, a first fee under the service plan for the subscriber's personal wireless telephone and a second fee under the service plan for the subscriber's vehicular wireless telephone. As these fees are for a full portfolio of services to each telephone, they may be large, and a subscriber may be forced to discontinue one of the subscriptions to save money. For example, a subscriber who frequently uses his or her personal telephone but only occasionally uses his or her vehicular telephone may decide to discontinue service for the vehicular wireless telephone, rather than to continue to pay two large subscription fees. Thus, the current differentiation between personal wireless telephone service and vehicular wireless telephone service has disadvantages to the wireless service providers for both personal wireless telephones and vehicular wireless telephones, and may also impose unnecessarily large service fees for a subscriber.

BRIEF SUMMARY OF THE INVENTION

Advantageously, various embodiments of the invention allow a subscriber's personal wireless telephone to share services with the subscriber's vehicular wireless telephone. For example, one embodiment of the invention provides a connectivity service between the subscriber's personal wireless telephone and the subscriber's vehicular wireless telephone. According to some embodiments of the invention, this connectivity service allows the subscriber's personal wireless telephone to communicate directly with the subscriber's vehicular wireless telephone, so that the wireless telephones can exchange voice information, data information or both. With other embodiments of the invention, the connectivity service allows communications intended for the subscriber's personal wireless telephone to be rerouted or relayed to the subscriber's vehicular wireless telephone, communications intended for the subscriber's vehicular wireless telephone to be rerouted or relayed to the subscriber's personal wireless telephone, or both.

According to another embodiment of the invention, the wireless service provider for the subscriber's personal wireless telephone and the wireless service provider for the subscriber's vehicular wireless telephone cooperate to allow the telephones to share one or more communication or concierge services provided for in the wireless service plan for the subscriber's personal wireless telephone, one or more communication or concierge services provided for in the wireless service plan for the subscriber's vehicular wireless telephone, or both. With this embodiment, for example, a subscriber can use his or her personal wireless telephone to enjoy a navigation directions service provided under the subscriber's vehicular wireless service plan. Similarly, a subscriber's vehicular wireless telephone and personal wireless telephone may share a voice mail service provided under the subscriber's personal wireless service plan.

With still yet another embodiment of the invention, the wireless service provider for the subscriber's personal wireless telephone and the wireless service provider for the subscriber's vehicular wireless telephone cooperate to allow the subscriber's personal and vehicular wireless telephones to share a single wireless service plan. With this arrangement, for example, a service plan may provide that the subscriber can employ both his or her personal wireless telephone and his or her vehicular wireless telephone to make up to 100 total minutes of wireless calls, transmit a predetermined number of short messaging service (SMS) messages, or transmit a predetermined number of kilobytes of data for a particular fee rate. The subscriber would then receive a single bill for the use of both wireless telephones under the service plan.

These and other features and advantages of the invention will become apparent with reference to the following description and the attached drawings.

DETAILED DESCRIPTION OF THE INVENTION

Figure 1:
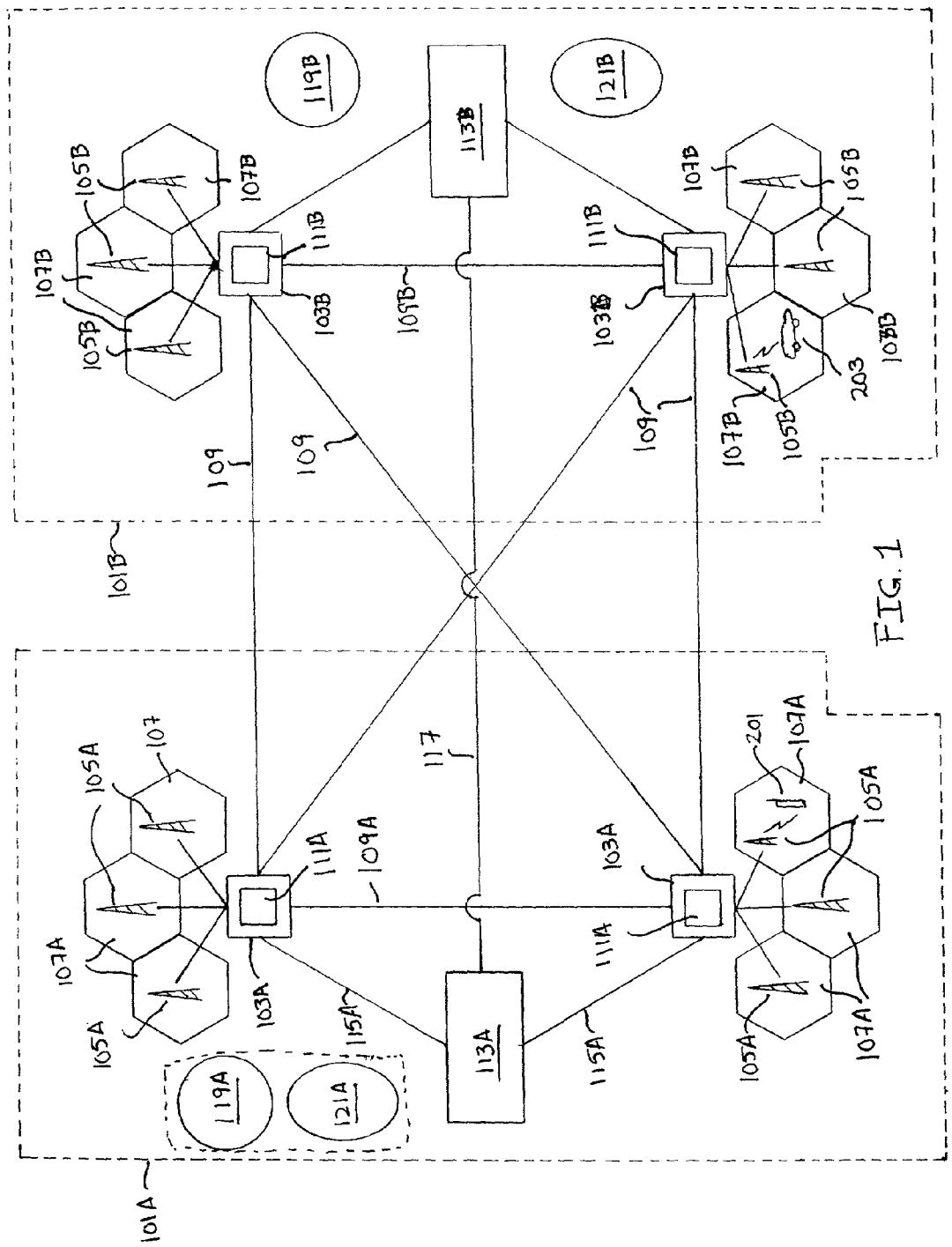
FIG. 1 illustrates wireless communication networks for conveying wireless telephone communications.

FIG. 1 illustrates two separate wireless telephone networks 101A and 101B. As will be explained in detail below, wireless telephone network 101A provides wireless communication for a user's (i.e., a subscriber's) personal wireless telephone 201, while network 101B provides wireless communication for the subscriber's vehicular wireless telephone 203. The term communication, as used herein, refers to the transfer of information using any type of electromagnetic signals, including, but not limited, analog voice signals and digital data signals.

Each wireless telephone network 101 includes one or more mobile switching centers 103, and each mobile switching center 103 is then connected to one or more wireless antennas 105. An antenna 105 transmits and receives wireless radio signals within a corresponding service area 107. As is known in the art, the service areas 107 for each mobile switching center 103 are usually laid out in a cellular arrangement, so that every section of a geographic region is serviced by a mobile switching center 103.

It should be noted that the term "vehicular wireless telephone," as used herein, is not limited to telephones with handsets. Instead, this term refers to any wireless communication device integrated into a vehicle. Thus, a vehicular wireless telephone according to the invention includes, but is not limited to, a wireless communication device that may or may not have an alphanumeric keypad for dialing numbers. For example, the vehicular wireless telephone 203 may be a wireless communication device with button-based activation for various functions, such as, but not limited to, establishing a circuit switch voice call or initiating a voice activated dialing system (including a voice activated dialing system employing either logic resident on the wireless telephone 203 and a voice activated dialing system employing either logic resident on the network 101B). The same or other buttons may be configured to set up data applications that utilize the wireless telephone network 101B.

The vehicular wireless telephone 203 may also be a telephone having caller identification number that may be capable of receiving calls from any outside telephone, or may have a caller identification number that can only be reached by the wireless service carrier 119B and/or the wireless service provider 121B. Further, the vehicular wireless telephone 203 may also be a wireless device that, in addition to transmitting wireless signals, can receive and display image data transmitted via such protocols as TCP/IP (e.g., Web pages written in a markup language, such as the Hypertext Markup Language (HTML)) or data encoded according to a Moving Pictures Experts Group (MPEG) standard.

Alternately, or additionally, the vehicular wireless telephone 203 may receive and employ data according to a variety of other data delivery protocols, such as Short Messaging Service (SMS), 1XRTT and General Packet Radio Service (GPRS) data delivery protocols. With some embodiments of the invention, the vehicular wireless device 203 may even be, for example, a receiver that only receives wireless signals and cannot transmit wireless signals, or a transmitter that only transmits wireless signals and cannot receive wireless signals.

Similarly, the personal wireless telephone 201 according to the invention includes, but is not limited to, a conventional wireless telephone that includes a handset with an alphanumeric keypad for dialing. For example, the wireless personal telephone 201 may be a personal digital assistant, laptop or other type of computer equipped to transmit or receive information via wireless communication. The personal wireless telephone 201 may even be, for example, a receiver that only receives wireless signals and cannot transmit wireless signals (e.g., a pager device), or a transmitter that only transmits wireless signals and cannot receive wireless signals.

The mobile switching center 103 serves as a conduit for communication signals to and from the wireless telephones in the area 107 that it services. Wireless transmissions received by an antenna 105 are delivered to that antenna's associated mobile switching center 103. The antenna 105 may be connected to its associated mobile switching center 103 through a variety of connections, including, but not limited to, for example, any combination of two wire and four wire analog circuits, digital connections, fiber optical connections, and microwave connections. The mobile switching center 103 routes a communication from the antenna 105 to the destination indicated by the source of the communication (i.e., the wireless telephone that sent the communication). Similarly, communications that are to be delivered to a wireless telephone are routed to the mobile switching center 103 serving the area 107 in which the wireless telephone is currently located. The mobile switching center 103 then relays the communication to the antenna 105 in the appropriate area 107 for wireless radio transmission to the wireless telephone.

As illustrated in FIG. 1, a mobile switching center 103 may be connected to one or more other mobile switching centers 103 in its wireless telephone network 101. A mobile switching center 103 may also be connected to one or more mobile switching centers 103 in other wireless telephone networks. These connections 109 may be, e.g., through an IS-41 carrying or SS-7 carrying GSM MAP (or other protocol) link, or any other suitable link. In addition, a mobile switching center 103 will also typically be linked to a public switched telephone network for relaying communications between a wireless telephone and a PSTN destination.

Typically, each mobile switching center 103 includes a home location register (HLR) 111. As is known in the art, the home location register 111 stores registration information and service profiles for the wireless telephones serviced by that mobile switching center 103. For example, a first wireless telephone serviced by a mobile switching center 103 may be subscribed to receive, e.g., a voice mail service and a call-waiting service. A second wireless telephone serviced by the same mobile switching center 103 may alternately be subscribed to receive, e.g., a caller identification service to identify the source of incoming calls. The home location register 111 would thus include data directing the mobile switching center 103 to provide the first wireless telephone with the voice mail and call-waiting services, and to provide the second wireless telephone with the caller identification service.

The mobile switching center 103 will also commonly include a visitor location register (VLR) (not shown), which stores service information for wireless telephones that are not normally associated with the mobile switching center 103, but which have temporarily roamed into the area serviced by the mobile switching center 103. Of course, while the home location registers 111 have been shown and described as being part of a mobile switching center 103, those of ordinary skill in the art will appreciate that a home location register 111A (and/or a visitor location register) may alternately be maintained separately from a mobile switching center 103.

As seen in FIG. 1, each network 101 will have at least one billing center 113. Each billing center 113 may have a connection 115 to one or more mobile switching centers 103 within the network 101, so that the centers 103 may report usage information to the billing center 113. The usage information from a mobile switching center 103 may include, for example, the time and destination of each wireless communication routed through the mobile switching center 103. The usage information may also include information regarding the type and use of other services provided by the mobile switching center 103 to its wireless telephones. If a wireless telephone normally associated with the billing center 113 roams beyond the range of its "home" mobile switching center 103, the billing center 113 may also receive usage information from a billing center 113 associated with the mobile switching center 103 to which the wireless telephone has "roamed," including a mobile switching center 103 that is part of a different wireless telephone network. Thus, FIG. 1 illustrates the billing center 113A as being connected to billing center 113B through link 117.

As is known in the art, the billing center 113 compiles the usage information for each wireless telephone associated with the billing center 113. The billing center 113 then prepares a bill for the wireless telephone's subscriber according to the compiled usage information and the service fee rates set forth in the wireless service plan for the subscriber's wireless telephone. As previously noted, for example, a service plan may provide that the wireless telephone 201 can have 100 minutes of wireless communication per month for a flat rate of $50, with each additional minute per month incurring a charge of $1 per minute. The billing center 113 obtains information regarding the total minutes of wireless communication used by the wireless telephone 201 from its "home" mobile switching center 103, other mobile switching centers 103 in the network 101 that have provided communication or another service to the wireless telephone 201, and even billing centers 113 associated with other networks 101 that have provided communication or another service to the wireless telephone 201.

In this example, if the total wireless usage by the telephone for a month is 120 minutes, then the billing center will accordingly generate a bill to the wireless telephone's subscriber for $70 (the $50 base rate plus $20 for 20 additional minutes in excess of the initial 100 minutes). The billing center 113 may also bill a subscriber based upon usage information relating to other services employed by the wireless telephone. For example, if the wireless telephone 201 is subscribed to receive communication services, such as voice mail service, call-waiting service, SMS messaging service, or other data services, the billing center 113 will appropriately charge the wireless telephone's subscriber for those services as provided in the subscriber's wireless service plan as well. Still further, the billing center may charge for the use of communication services provided to the wireless telephone by a third party vendor on behalf of that vendor.

A wireless service carrier 119, such as, e.g., AT&T Wireless Services, Inc., maintains each wireless network 101. In some instances, the wireless service carrier also acts as the service provider 121 that establishes a wireless service plan for the wireless telephone. For example, network 101A is illustrated as servicing the personal wireless telephone 201. With this arrangement, the wireless service carrier is also typically the wireless service provider. More particularly, for the network 101A, the wireless service carrier 119A is responsible for providing and maintaining the infrastructure for communication between the wireless telephone 201, the antennas 105A, the mobile switching centers 103A and the billing center 113A. The wireless service carrier 119A also acts as the wireless service provider 121A that enters into the service plan agreement with the personal wireless telephone's subscriber. Thus, the wireless service carrier 119A for network 101A also determines which services and billing rates are available to the personal wireless telephone 201.

The wireless network 101B servicing the subscriber's vehicular wireless telephone 203 also is maintained by a wireless service carrier 119B, such as AT&T Wireless Services, Inc. With the vehicular wireless telephone 203, however, the subscriber typically enters into a service plan agreement with a wireless service provider 121B that is different than the wireless service carrier 119B that actually maintains the network 101B. For example, it is common for the vehicle's manufacturer (or a subsidiary of the vehicle's manufacturer) to arrange and enforce the service plan agreement for the vehicular wireless telephone 203. As previously discussed above, the service provider 121B conventionally will prohibit incoming calls from being routed to the vehicular wireless telephone 203. In addition, the service provider 121B may provide (or authorize the wireless service carrier 119B to provide) services for the vehicular telephone that are unavailable through the subscriber's personal wireless telephone 201.

According to one embodiment of the invention, the service provider 121B for the vehicular wireless telephone 203 provides a connectivity service for sharing information between the vehicular wireless telephone 203 and the personal wireless telephone 201. According to some embodiments of the invention, this connectivity service allows the personal wireless telephone 201 to communicate with the vehicular wireless telephone 203. With other embodiments of the invention, the connectivity service allows the personal wireless telephone 201 to reroute communications intended for the personal wireless telephone 201 to the vehicular wireless telephone 203, allows the vehicular wireless telephone 201 to reroute communications intended for the vehicular wireless telephone 201 to the personal wireless telephone 203, or both. With still other embodiments of the invention, the connectivity service allows the wireless telephones to both communicate with each other, and to reroute communications intended for one or both of the wireless telephones to the other.

The connectivity service according to the invention offers a number of advantages to the subscriber. With the embodiments of the invention where the connectivity service allows the personal wireless telephone 201 and the vehicular wireless telephone 203 to communicate with each other, for example, a subscriber may download data, such as stored telephone numbers, calendar information, digital money, electronic mail messages, SMS messages, and other data employed by software applications, from the personal wireless telephone 201 to the vehicular wireless telephone 203 or vice versa. Thus, if the vehicular wireless telephone 203 has a larger display than the personal wireless telephone 201, a subscriber that has stored electronic mail messages on his or her vehicular wireless telephone can transfer some or all of the electronic mail messages to his or her personal wireless telephone 203 for viewing on the larger display. Alternately, or additionally, the personal wireless telephone 201 can be used to place a telephone call to the vehicular wireless telephone.

Further, with the connectivity service according to some embodiments of the invention, the subscriber can use the communication between the personal wireless telephone 201 and the vehicular wireless telephone 203 to relay incoming calls from one wireless telephone to another. For example, a subscriber may not want to receive voice signal telephone calls on his or her personal wireless telephone 201 while driving, and would instead prefer to receive voice signal telephone calls on a hands free vehicular wireless telephone. With these embodiments of the invention, the subscriber may thus have incoming voice signal telephone calls intended for the personal wireless telephone 201 relayed from the personal wireless telephone 201 to the vehicular wireless telephone 203.

Similarly, a subscriber may not want to receive data via a protocol, such as TCP/IP, containing image information through a vehicular wireless telephone 203 that does not include a display screen capable of displaying the information conveyed in the signal. Instead, the subscriber may prefer to receive such calls on a personal wireless telephone 201 that has a display screen, such as a personal digital assistant or laptop computer equipped for wireless communication. Thus, the subscriber can have calls carrying such image data relayed from the vehicular wireless telephone 203 to the personal wireless telephone 201 for display.

While the above example refers specifically to image data, with the various embodiments of the invention where the connectivity service provides for communication from the vehicular wireless telephone 203 to the personal wireless telephone 201 or vice versa, the subscriber may have telephone calls carrying any type of information relayed from the one wireless telephone to the other wireless telephone 201 as desired. Those of ordinary skill in the art will appreciate that communication between the personal wireless telephone 201 and the vehicular wireless telephone 203 offer numerous other advantages in addition to those specifically noted as examples above.

According to still other embodiments of the invention, the connectivity service may allow the wireless telephones to share information by permitting one or both of the wireless telephones to reroute telephone calls or other wireless transmissions intended for one wireless telephone to the other wireless telephone. For example, with some embodiments of the invention, the connectivity service allows the subscriber to have telephone calls or other wireless transmissions intended for the personal wireless telephone 201 rerouted to the vehicular wireless telephone 203.

Thus, as described above, the subscriber can have telephone calls carrying voice signals rerouted from a personal wireless telephone 201 to a hands free vehicular wireless telephone 203 when the subscriber is driving. With this embodiment of the invention, however, the voice signal telephone call can be relayed directly by the networks 101A and 101B, however, without requiring that any portion of the signal be stored in the personal wireless telephone 201. Similarly, with various embodiments of the invention, the subscriber can use the connectivity service to reroute telephone calls or other wireless transmissions intended for the vehicular wireless telephone 203 to the personal wireless telephone 201. Thus, in the above noted example, the subscriber can use the connectivity service to reroute telephone calls carrying digital information signals with image information intended for the vehicular wireless telephone 203 to the personal wireless telephone 201 where desired.

Figure 2A:
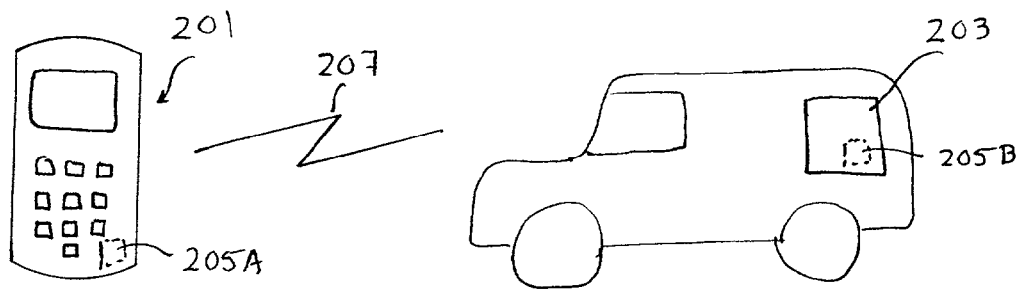
FIGS. 2A-2C show various arrangements for providing communication between a vehicular wireless telephone and a personal wireless telephone according to embodiments of the invention.
Figure 2B:
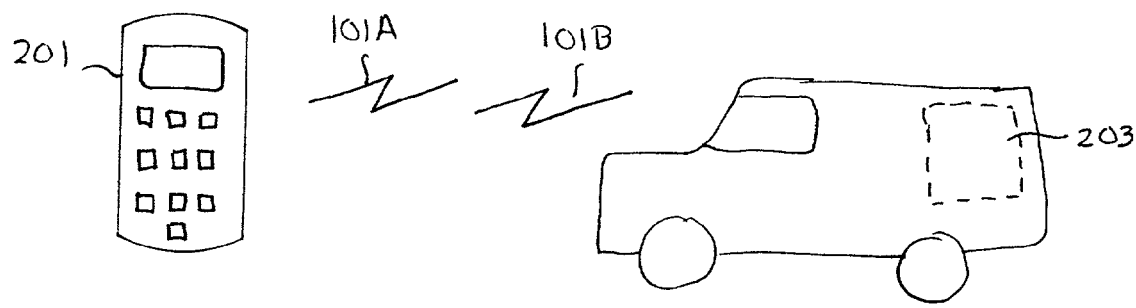
Figure 2C:
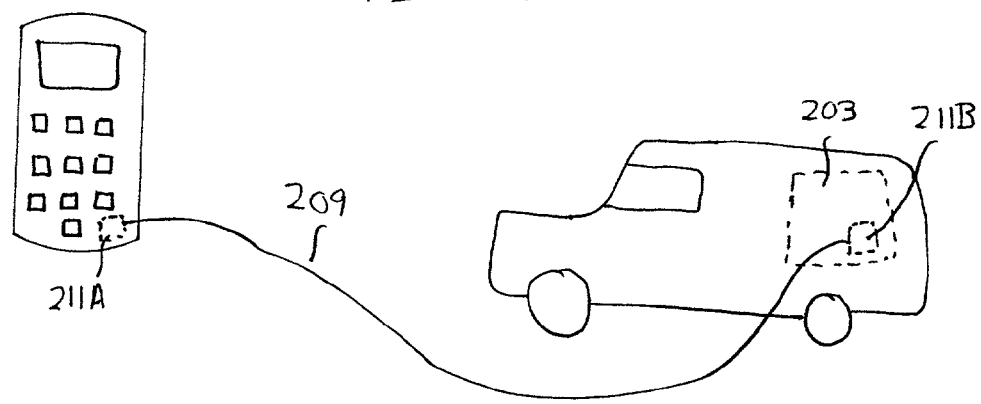

As shown in FIGS. 2A-2C, the connectivity service according to various embodiments of the invention can be implemented in a number of different ways. First, for example, the service provider 121B can configure the vehicular wireless telephone 203 to communicate directly with the personal wireless telephone 201 by a wireless local area network (LAN), as illustrated in FIG. 2A. With this embodiment, both the personal wireless telephone 201 and the vehicular wireless telephone 203 can be constructed or modified to each include a wireless LAN communication unit 205 that can be used as communication node in a wireless LAN 207. As will be appreciated by those of ordinary skill in the art, the wireless LAN communication unit 205 may be made up of electronic circuitry (analog circuitry or digital circuitry), a software application, or a combination of the two. Such wireless LAN communication units 205 for communicating over a wireless LAN 207 are well known in the art, and thus will not be discussed herein in detail. The wireless LAN communication units 205 may communicate using any suitable wireless LAN protocol, such as the Bluetooth of WiFi wireless LAN protocols, which similarly are well known in the art and thus will not be discussed here in detail.

It should be noted, however, that with some embodiments of the invention, one or both of the wireless LAN communication units 205 (i.e., the wireless LAN communication unit 205 for the personal wireless telephone 201 and the wireless LAN communication unit 205 for the vehicular wireless telephone 203) may be rendered inoperable until the subscriber activates the connectivity service. For example, the wireless LAN communication unit 205B may be disabled until it receives a proper activation code from the subscriber or the wireless service provider 121B. When the subscriber requests the connectivity service, the wireless service provider 121B can then provide the activation code to activate the wireless LAN communication unit 205B in the vehicular wireless telephone 203, either directly to the wireless telephone 203 or to the subscriber to input into the wireless telephone 203.

Alternately, the wireless LAN communication unit 205B may ignore wireless LAN communications from a source that does not provide a proper identity authentication code. With this arrangement, for example, the wireless LAN communication unit 205A in the personal wireless telephone 201 may be activated to communicate with the vehicular wireless telephone 203 via the wireless LAN 207 by receiving the proper identity authentication code. The subscriber may provide the identity authentication code by inputting the code directly into the personal wireless telephone 201 for its use in communication with the wireless telephone 201, or, e.g., the wireless service provider 121A may append the identity authentication code on all communications that may be relayed to the vehicular wireless telephone 203.

It should be noted that verification of the identity authentication code can be performed either by the personal wireless telephone 201 or by the network 101A, or by a combination of both. Of course, a variety of still other techniques for limiting the operation of the wireless LAN communication units 205 until the connectivity service is activated will be apparent to those of ordinary skill in the art.

As previously noted, according to another embodiment of the invention illustrated in FIG. 2B, the service provider 121B for the vehicular wireless telephone 203 can configure the vehicular wireless telephone 203 to allow two-way communication with the subscriber's personal wireless telephone 201 using the wireless telephone service provided by networks 101A and 101B. The service provider 121B can, for example, provide the subscriber with a telephone number for calling the vehicular wireless telephone 203. The service provider 121B can then instruct the mobile switching center 103 servicing the vehicular wireless telephone 203 to connect an incoming call to the number of the vehicular wireless telephone 203 from the subscriber's personal wireless telephone 201.

With alternate embodiments of the invention, the service provider 121B may provide the subscriber with a general access telephone number and identification data (e.g., a personal identification number (PIN)) for identifying and authenticating the identity of the personal wireless telephone 201 or the identity of the subscriber. When the subscriber then dials the general access telephone number from the personal wireless telephone 201, and subsequently provides the identity authentication data, the mobile switching center 103 servicing the vehicular wireless telephone 203 will connect the personal wireless telephone 201 to the vehicular wireless telephone 203. Of course, still other variations for allowing communication between the personal wireless telephone 201 and the vehicular wireless telephone 203 through wireless telephone networks after the subscriber has subscribed to the connectivity service will be apparent to those of ordinary skill in the art.

Still further, the arrangement shown in FIG. 2B will allow the networks 101A and 101B to alternately or additionally reroute telephone calls or other wireless transmissions intended for one wireless telephone to the other wireless telephone. Thus, this arrangement will allows telephone calls or other wireless transmissions intended for the personal wireless telephone 201 to be rerouted to the vehicular wireless telephone 203, telephone calls or other wireless transmissions intended for the vehicular wireless telephone 203 to be rerouted to the personal wireless telephone 201, or both.

As illustrated in FIG. 2C, the service provider 121B may configure the vehicular wireless telephone 203 to connect directly to the subscriber's personal wireless telephone 201 by a cable 209. For example, the service provider 121B may have the vehicular wireless telephone 203 constructed (or retrofitted) to include a cable communication unit 211B that will allow the vehicular wireless telephone 203 to connect to and then communicate directly with the personal wireless telephone 201 over the cable 209. Similarly, the service provider 121A may have the personal wireless telephone 201 constructed (or retrofitted) to include a cable communication unit 211A that will allow the personal wireless telephone 201 to connect to and then communicate with the vehicular wireless telephone 203 through the cable 209. As explained in detail with regard to the wireless LAN communications units 205 above, however, the cable communication units 211 can be rendered inoperable until the subscriber activates the connectivity service.

As will be appreciated by those of ordinary skill in the art, the cable communication units 211 may be implemented with a software application, electrical circuitry (e.g., analog or digital electronic circuitry), or a combination of both. When the subscriber subscribes the personal wireless telephone 201 (or, alternately, the vehicular wireless telephone 203) to the connectivity service, the service provider 121A, the service provider 121B, or both activate the cable communication units 211 to allow the personal wireless telephone 201 to communicate with the vehicular wireless telephone 203 through the cable 209. The cable 209 may be any suitable type of communication cable, such as a serial data cable, a universal service bus (USB) cable, a Firewire cable, or a proprietary or telephone-specific connection cable.

Of course, those of ordinary skill in the art will appreciate that the connectivity service according to various embodiments of the invention can be implemented using any combination of the arrangements shown in FIGS. 2A-2C. For example, the personal wireless telephone 201 may use the wireless LAN 207 to detect when it is in close proximity to the vehicular wireless telephone 203. Upon detection of its close proximity to the vehicular wireless telephone 203, the personal wireless telephone 201 may then signal its associated switching center 103 to reroute all calls intended for the personal wireless telephone 201 to the vehicular wireless telephone 203, according to the configuration shown in FIG. 2B.

Figure 3A:
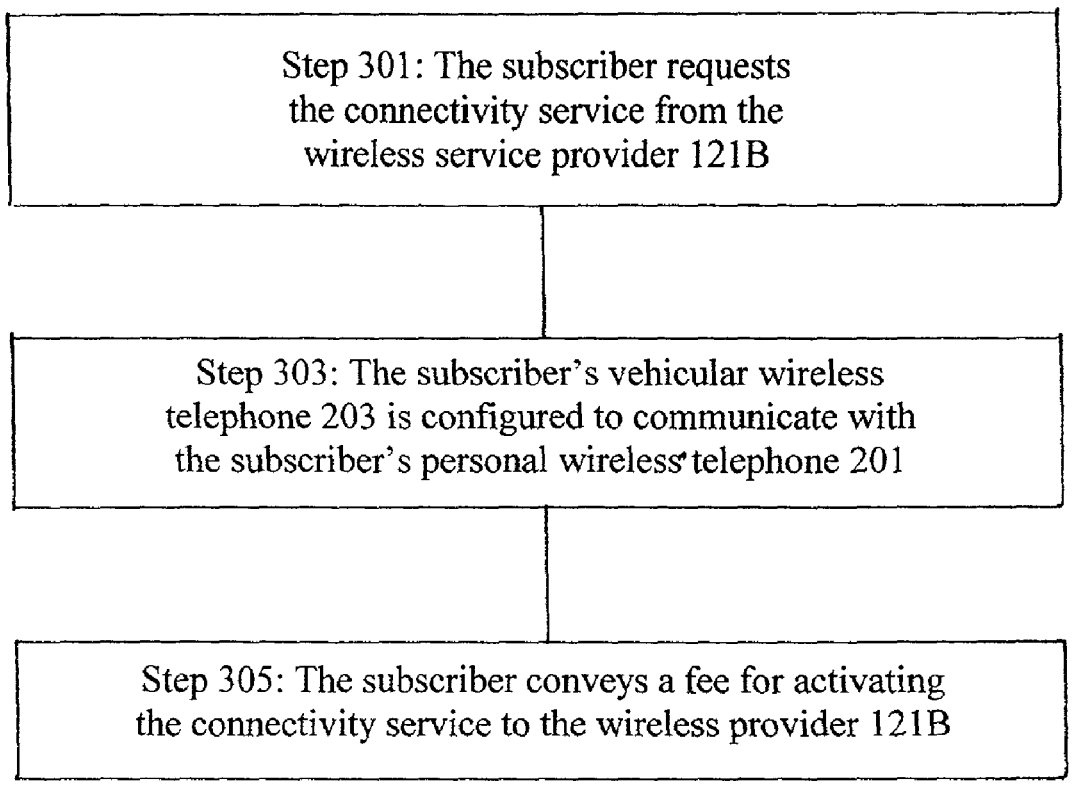
FIGS. 3A and 3B illustrate methods of employing a connectivity service from a wireless service provider according to various embodiments of the invention.

As will be appreciated by those of ordinary skill in the art, the connectivity service described above offers obvious advantages and conveniences to the subscriber. Thus, a wireless service provider may choose to offer this service to a subscriber at no cost. Some embodiments of the invention, however, further allow the service providers 121A and 121B to generate revenue when a subscriber subscribes to the connectivity service. One method that provides this revenue opportunity according to various embodiments of the invention is shown in FIG. 3A.

First, in step 301, the subscriber requests the connectivity service from the wireless service provider 121B. Next, in step 303, the subscriber's vehicular wireless telephone 203 is configured to communicate with the subscriber's personal wireless telephone 201. Then, in step 305, the subscriber conveys a fee for activating the connectivity service to the wireless provider 121B. It should be noted that the fee may be a fee specifically associated with the connectivity service. Alternately, the fee may not be specific to the connectivity service, and may instead be for a package of different services provided in a service plan that includes the connectivity service. Further, the fee may be determined according to any method, such as a flat rate per month, a per-use charge, or any other desired calculation.

Figure 3B:
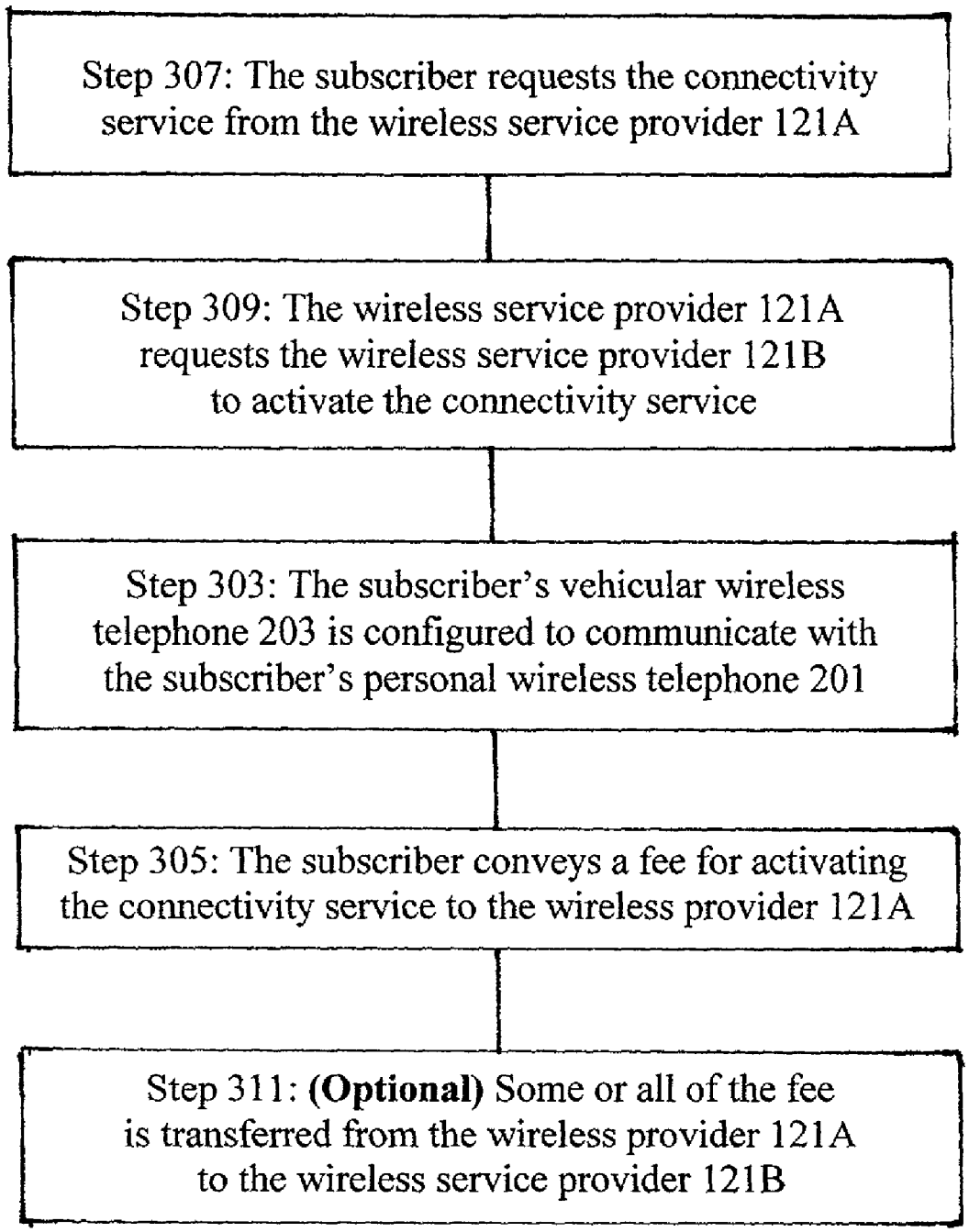

A method according to yet another embodiment of the invention is illustrated in FIG. 3B. In this embodiment, in step 307, the subscriber requests the connectivity service from the wireless service provider 121A rather than from wireless service provider 121B. With this embodiment, the wireless service providers 121A and 121B have agreed to cooperate in order to provide the connectivity service. Next, in step 309, the wireless service provider 121A requests the wireless service provider 121B to activate the connectivity service. Then, in step 303, the subscriber's vehicular wireless telephone 203 is configured to communicate with the subscriber's personal wireless telephone 201.

In step 305, the subscriber conveys a fee for activating the connectivity service to the wireless provider 121A, instead of the wireless provider 121B as in the previously described embodiment. Again, the fee may be specifically associated with the connectivity service, or the fee may not be specific to the connectivity service, and may instead be for a package of different services provided in a service plan that includes the connectivity service. Further, the fee may be determined according to any method, such as a flat rate per month, a per-use charge, or any other desired calculation. In an optional step 311, some (or all) of the fee is transferred from the wireless provider 121A to the wireless service provider 121B for providing the connectivity service. Of course, those of ordinary skill in the art will appreciate that either of the methods described above can be modified according to various embodiments of the invention. For example, with both embodiments, the fee for activating the connectivity service can be paid at any time (e.g., before or after the connectivity service is actually activated, before or after the wireless service provider providing the service is contacted, etc).

In addition to allowing communication between the personal wireless telephone 201 and the vehicular wireless telephone 203, various embodiments of the invention may also allow the personal wireless telephone 201 and the vehicular wireless telephone 203 to share one or more wireless services provided for under the wireless service agreement for the personal wireless telephone 201, the vehicular wireless telephone 203, or both. These shared services may be provided by the wireless service carrier 119A or wireless service carrier 119B at the authorization or direction of the wireless service provider 121A or the wireless service provider 121B. Still further, a third party vendor may provide these services at the authorization or direction of the wireless service provider 121A or the wireless service provider 121B.

Thus, the personal wireless telephone 201 and the vehicular wireless telephone 203 may share any type of communication service, i.e., any type of service that relates to the receipt, transmission or other handling of a wireless communication. For example, the wireless service carrier 119A may provide a voice mail account for the personal wireless telephone 201. Typically, with this type of service, the subscriber (or other authorized user) accesses the voice mail account by calling the personal wireless telephone 201. When the mobile switching center 103A servicing the personal wireless telephone 201 detects that the telephone is not answering the call, the mobile switching center 103A routes the call to the voice mail account associated with the personal wireless telephone 201. The subscriber or other authorized user can then enter a personal identification number (PIN) or other identity authentication data to access and retrieve the voice mail message in the voice mail account. Alternately or additionally, a caller can leave a voice message in the voice mail account.

According to various embodiments of the invention, the subscriber may elect to have the voice mail service for the personal wireless telephone 201 shared with the vehicular wireless telephone 203. With this arrangement, the wireless service carrier 119B stores data in the home location register 111B servicing the vehicular wireless telephone 203 indicating that the personal wireless telephone's voice mail service is to be shared with the vehicular wireless telephone 203. Thus, when the mobile switching center 103B detects that the vehicular wireless telephone 203 is not answering a call, the data in the home location register 111B will instruct the mobile switching center 103B to reroute the call to the subscriber's voice mail account associated with the personal wireless telephone 201.

With some embodiments of the invention, the mobile switching center 103B can reroute the call to the voice mail account indirectly, e.g., by rerouting the call to the personal wireless telephone 201. The caller can then wait until the mobile switching center 103A servicing the personal wireless telephone 201 determines that the telephone is not answering the call, and reroutes the call to the voice mail account. Alternately, with the cooperation of the wireless service carrier 119A, the mobile switching center 103B may reroute the call directly to the voice mail account for the personal wireless telephone 201.

With other embodiments of the invention, concierge services provided by either the wireless service provider 121A or the wireless service provider 121B may also be shared by the personal wireless telephone 201 and the vehicular wireless telephone 203. The term concierge services as used herein refers to any other type of service offered by a wireless service provider other than communication services. For example, the wireless service provider 121B may offer a navigational directions service through the vehicular wireless telephone 203. With this service, the vehicle's driver can call the wireless service provider 121B using the vehicular wireless telephone 203 to obtain directions to navigate to a particular location. If this service is shared according to the invention, then the subscriber may use his or her personal wireless telephone 201 to call the wireless service provider 121B to ask for directions as well.

The wireless service provider 121B may, e.g., maintain a database of telephone numbers for personal wireless telephones authorized to receive the navigation directions service. When the subscriber calls the wireless service provider 121B with the personal wireless telephone 201 to employ the service, the wireless service provider 121B can compare the telephone number of the personal wireless telephone 201 with the numbers in the database. If the wireless service provider 121B recognizes from the database that the caller is authorized to receive navigation directions in accordance with the wireless service agreement for the vehicular wireless telephone 203, then the subscriber can receive navigation directions over the personal wireless telephone 201.

Figure 4A:
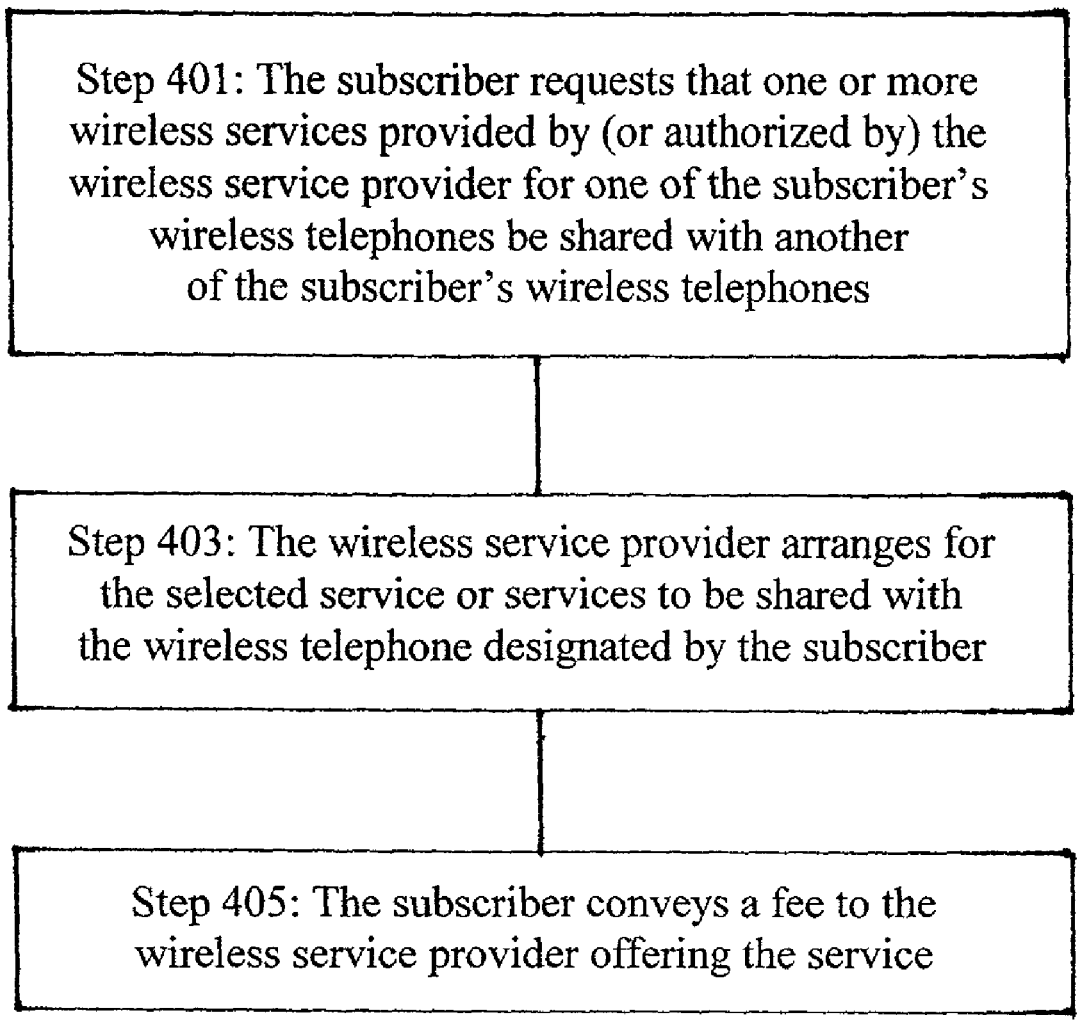
FIGS. 4A and 4B illustrate a method of obtaining a connectivity service from a wireless service provider according to various embodiments of the invention.

As will be appreciated by those of ordinary skill in the art, the sharing of services between a personal wireless telephone 201 and a vehicular wireless telephone 203 offers a number of benefits to the subscriber of the telephones. Thus, a wireless service provider may offer sharing of services according to various embodiments of the invention without charge to the subscriber. Some embodiments of the invention, however, offer a wireless service provider or providers a method of obtaining revenue by employing the embodiments of the invention, as illustrated in, e.g., FIG. 4A.

In step 401 shown in this figure, the subscriber first requests that one or more wireless services provided by (or authorized by) the wireless service provider for one of the subscriber's wireless telephones be shared with another of the subscriber's wireless telephones. For example, if the subscriber wants to share a service provided for the vehicular wireless telephone 203 with his or her personal wireless telephone 201, the subscriber submits a request to share the service to the wireless service provider 121B. Likewise, if the subscriber wants to share a service provided for the personal wireless telephone 201 with his or her vehicular wireless telephone 203, the subscriber submits a request to share the service to wireless service provider 121A.

Next, in step 403, the wireless service provider receiving the request arranges for the selected service or services to be shared with the wireless telephone designated by the subscriber. Thus, if the wireless service provider 121A directly provides the service or services for the personal wireless telephone 201, the wireless service provider 121A arranges for the service to also be shared with the vehicular wireless telephone 203. Similarly, if the wireless service carrier 119A provides the service or services for the personal wireless telephone 201 at the behest of the wireless service provider 121A, the wireless service provider 121A arranges for the wireless service carrier 119A to also provide the service or services to the vehicular wireless telephone 203.

This step may entail storing data for use by the mobile switching center 103 servicing the wireless telephone initially receiving the service or services to be shared. This step may additionally, or alternately, include updating a database of service recipients maintained by the wireless service provider 121 providing the service. Further, this step may include contacting or cooperating with the wireless service carrier 119 or wireless service provider 121 servicing the wireless telephone that will receive the benefit of the shared service or services.

Then, in step 405, the subscriber conveys a fee to the wireless service provider offering the service. As previously noted, the fee may be a fee specifically associated with the sharing of one or more services, or the fee may not be specific to the sharing of services, and may instead be for a package of different services provided in a service plan that includes the sharing of one or more services between the wireless telephones 201 and 203. Further, the fee may be determined according to any method, such as a flat rate per month, a per-use charge, or any other desired calculation. Thus, the wireless service provider 121 initially offering the service or services to one of the subscriber's wireless telephones may receive additional revenue for sharing one or more of those services with another of the subscriber's wireless telephones.

Figure 4B:
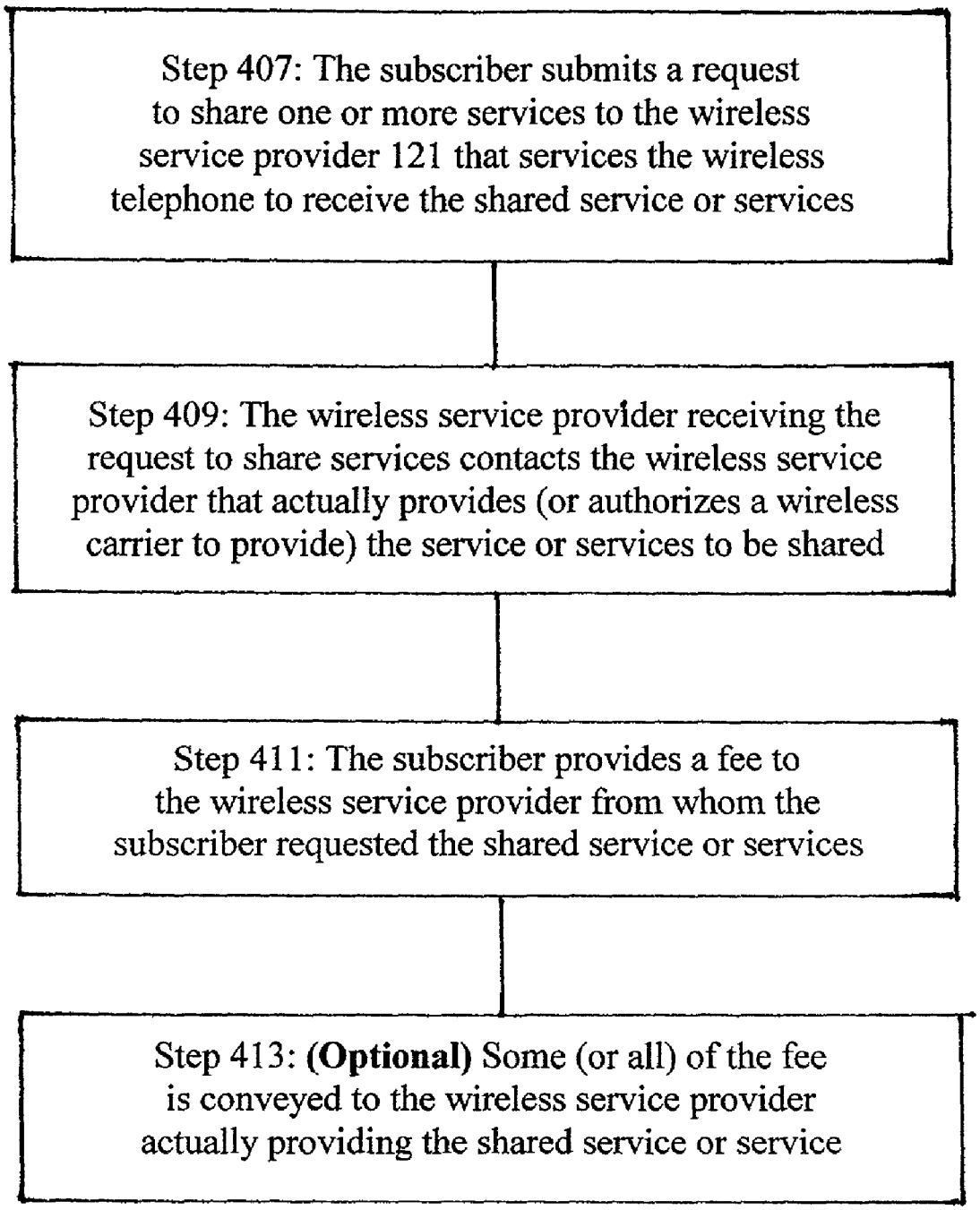

Yet another method of obtaining revenue according to various embodiments of the invention is illustrated in FIG. 4B. Unlike the method illustrated in FIG. 4A, in this method the subscriber does not request service sharing from the wireless service provider that provides (or authorizes providing) the service or services to be shared. Instead, in step 407, the subscriber submits a request to share one or more services to the wireless service provider 121 that services the wireless telephone that will receive the shared service or services.

For example, if the subscriber wishes to have his or her personal wireless telephone 201 share one or more services provided by (or authorized by) the wireless service provider 121B for the subscriber's vehicular wireless telephone 203, the subscriber requests sharing of these services from the wireless service provider 121A that services the personal wireless telephone 201, rather than from the wireless service provider 121B. Similarly, if the subscriber wishes to have his or her vehicular wireless telephone 203 share one or more services provided by (or authorized by) the wireless service provider 121A for the subscriber's personal wireless telephone 201, the subscriber requests sharing of these services from the wireless service provider 121B that services the subscriber's vehicular wireless telephone 203, rather than from the wireless service provider 121A.

Next, in step 409, the wireless service provider receiving the request to share services contacts the wireless service provider that actually provides (or authorizes a wireless service carrier to provide) the service or services to be shared, or otherwise arranges for the desired service or services to be shared. For example, if sharing the desired service or services requires the participation of the wireless service provider (e.g., sharing of a navigation direction service), then the wireless service provider receiving the request to share the service directly contacts the wireless service provider that provides the service, and negotiates sharing of the desired service.

Alternately, if sharing the desired service or services does not require the explicit participation of the wireless service provider providing the service (e.g., a voice mail service as discussed above), then the wireless service provider receiving the request simply arranges makes the necessary arrangements to have the service shared. Thus, to share a voice mail service as described above, for example, the wireless service provider receiving the request to share the voice mail service may update the home location register 111 servicing the wireless telephone receiving the shared voice mail service to include data that will instruct the associated mobile switching center 103 to reroute calls from this telephone to the wireless telephone sharing the voice mail service.

Then, in step 403, the wireless service provider that provides (or authorizes) the service or services arranges for the selected service or services to be shared with the wireless telephone designated by the subscriber. Thus, if the wireless service provider 121A provides the service or services for the personal wireless telephone 201, the wireless service provider 121A arranges with the wireless service provider 121B for the service to be shared with the subscriber's vehicular wireless telephone 203.

Similarly, if the wireless service provider 121B provides the service or services for the subscriber's vehicular wireless telephone 203, it arranges with the wireless service provider 121A for the service to also be shared with the subscriber's personal wireless telephone 201. As previously noted, this step may entail storing data in the mobile switching center 103 servicing the wireless telephone initially receiving the service or services to be shared. This step may additionally, or alternately, include updating a database of service recipients maintained by the wireless service provider providing the service. Further, as discussed above, with some services the wireless service provider may share a service with a wireless telephone without being expressly aware of sharing the service.

In step 411, in return for receiving shared service or services among the subscriber's mobile telephones 201 and 203, the subscriber provides a fee to the same wireless service provider from whom the subscriber requested the shared service or services. As previously noted, the fee may be a fee specifically associated with the sharing of one or more services, or the fee may not be specific to sharing of services, and may instead be for a package of different services provided in a service plan that includes the sharing of one or more services between the wireless telephones 201 and 203. Further, the fee may be determined according to any method, such as a flat rate per month, a per-use charge, or any other desired calculation. Then, in step 413, some (or all) of this fee is conveyed to the wireless service provider actually providing the shared service or service. Thus, according to this embodiment of the invention, both wireless service providers may derive additional revenue by cooperating to share one or more services between the subscriber's mobile telephones. Of course, both steps 411 and 413 are optional. Either mobile service provider may share one or more services at no cost to the subscriber.

According to still other embodiments of the invention, the personal wireless telephone 201 and the vehicular wireless telephone 203 will share a wireless service plan. With these embodiments, the wireless telephones 201 and 203 may share one or more services provided under the plan, including basic communication services. For example, a fixed rate for a total predetermined number of minutes of communication (e.g., a predetermined number of minutes of calling time) may be shared between the wireless telephones 201 and 203, and each minute of communication made by either wireless telephone may be debited against the total predetermined number of minutes corresponding to the fixed rate. These services (including basic communication service) can be shared using any of the techniques described above, or they may be shared simply by having the wireless telephones share a single wireless service carrier 119 or a single wireless service provider 121. Additionally, the wireless service plan can provide that the wireless telephones 201 and 203 will receive different services, but compile the fees associated with those services into a single bill for the subscriber.

Figure 5:
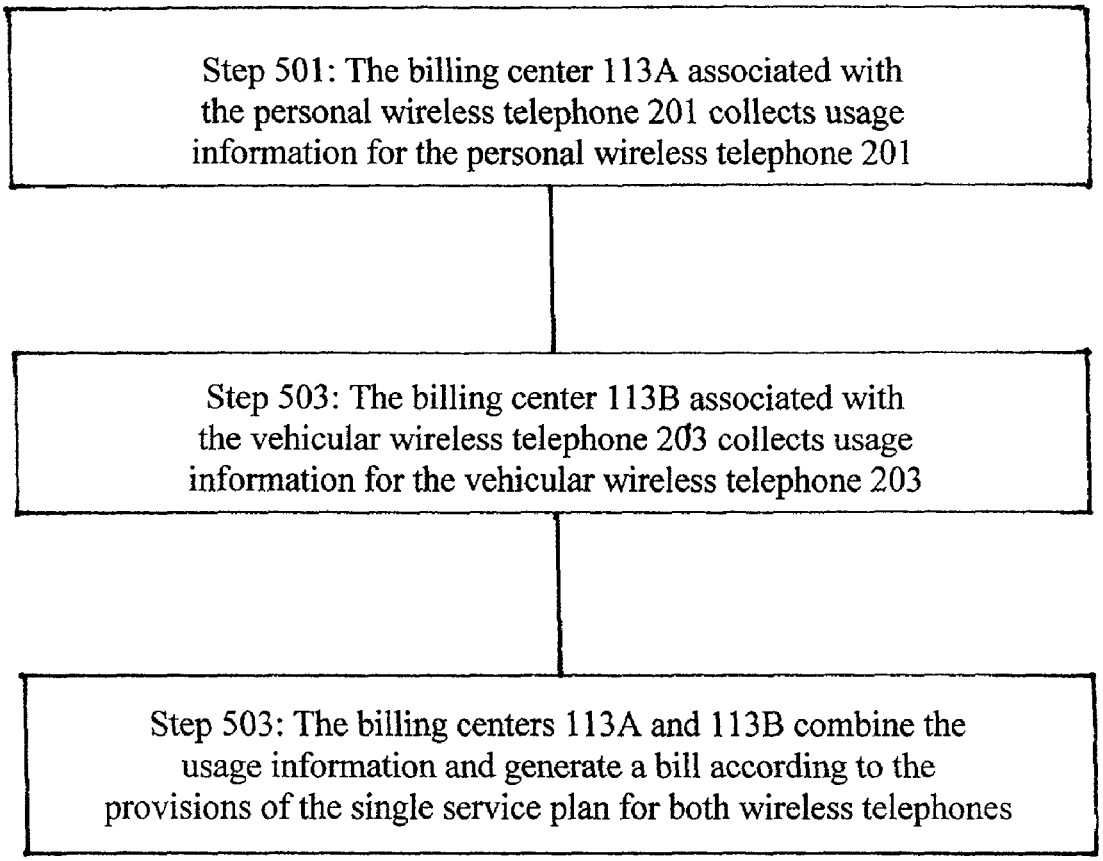
FIG. 5 illustrates a method of sharing a wireless service plan according to various embodiments of the invention.

One method for sharing a service plan according to the invention is shown in FIG. 5. As seen in this figure, in step 501 the billing center 113A associated with the personal wireless telephone 201 collects usage information for the personal wireless telephone 201. Next, in step 503, the billing center 113B associated with the vehicular wireless telephone 203 collects usage information for the vehicular wireless telephone 203. Then, in step 503, the billing centers 113A and 113B combine the usage information and generate a bill according to the provisions of the single service plan for both wireless telephones.

Thus, by sharing a wireless service plan, the subscriber conveniently receives a single bill for the use of both the personal wireless telephone 201 and the vehicular wireless telephone 203. Moreover, if sharing the wireless service plan includes sharing one or more services, such as a basic communication service, the subscriber may be able to pay lower fees than by having two separate service plans for different wireless telephones.

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation as illustrated and described. For example, while the wireless telephone networks 101A and 101B have been described above as conventional wirelesss telephone networks employing radio frequency signals, those of ordinary skill in the art will appreciate that the embodiments of the invention may be implemented using any type of wireless communication network, such as networks using microwave frequency signals or networks employing a variety of wireless communication protocols (e.g., a Bluetooth or WiFi network).

Further, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A wireless communication system, comprising:
a first wireless telephone subscribed to receive one or more services including a voicemail service from a first wireless service provider, the first wireless telephone being a personal wireless telephone and;
a second wireless telephone subscribed to receive one or more services including a hands-free dialing service from a second wireless service provider and sharing at least one service of the one or more services with the first wireless telephone, the second wireless telephone being a vehicular wireless telephone integrated into an electrical control system of a vehicle, a home location register servicing the vehicular wireless telephone indicating a sharing of the voice mail service of the personal wireless telephone with the vehicular wireless telephone, the home location register instructing a mobile switching center to reroute a call to a voice mail account of the personal wireless telephone responsive to detection of a no answer by the vehicular wireless telephone of the call;
the first wireless telephone and the second wireless telephone sharing a single wireless service plan administered by the first wireless service provider or the second wireless service provider, and
a single billing report under the single wireless service plan, the single wireless service plan including a connectivity service for sharing information between the vehicular wireless telephone and the personal wireless telephone.

2. A wireless communication system as in claim 1 comprising:
the vehicular wireless telephone including a receiver for receiving display image data encoded according to a Moving Pictures Experts Group (MPEG) standard and a display for displaying said MPEG encoded image data, the connectivity service including relaying calls carrying said MPEG encoded image data to a personal wireless telephone for display responsive to subscriber input.

3. A wireless communication system as in claim 1 comprising:
the second wireless service provider providing a shared concierge service including roadside assistance and navigation services, said connectivity service delivering navigation directions to said personal wireless telephone responsive to a comparison of the telephone number of the personal wireless telephone with telephone numbers of a database of personal wireless telephone numbers authorized to receive navigation directions.

4. A wireless communication system as in claim 1 comprising:
the second wireless service provider providing a shared concierge service including a navigation service responsive to receiving a request to share said concierge service at said second wireless service provider.

5. A wireless communication system as in claim 1 comprising:
the personal wireless telephone transferring an electronic mail message to the vehicular wireless telephone, the vehicular wireless telephone comprising a larger display than said personal wireless telephone, said connectivity service including electronic mail message sharing responsive to receiving a request for sharing said electronic mail message service at said first wireless service provider.

6. A wireless communication system as in claim 1 comprising:
the personal wireless telephone receiving concierge service of the second wireless service provider, responsive to receiving a request to share said concierge service at said second wireless service provider.

7. A wireless communication system as in claim 1 comprising:
the vehicular wireless telephone including a receiver for receiving display image data encoded according to a Moving Pictures Experts Group (MPEG) standard and a display for displaying said MPEG encoded image data, the connectivity service including relaying calls carrying said MPEG encoded image data from a personal wireless telephone to the vehicular wireless telephone for display responsive to subscriber input.

8. A wireless communication system, comprising:
a first wireless telephone subscribed to receive a first call service measured by communication minutes and a second call service measured by a predetermined number of short message service messages and a voicemail service from a first wireless service provider, the first wireless telephone being a personal wireless telephone and;
a second wireless telephone subscribed to receive a third call service comprising a concierge service from a second wireless service provider and sharing at least one service of the first, second or third call services between the first wireless telephone and the second wireless telephone, the second wireless telephone being a vehicular wireless telephone integrated into an electrical control system of a vehicle, a home location register serving the vehicular wireless telephone indicating a sharing of the voice mail service of the personal wireless telephone with the vehicular wireless telephone, the home location register instructing a mobile switching center to reroute a call to a voice mail account of the personal wireless telephone responsive to detection of no answer by the vehicular wireless telephone of the call;
the first wireless telephone and the second wireless telephone sharing a single wireless service plan administered by the first wireless service provider or the second wireless service provider, and
a single billing report under the single wireless service plan, the personal wireless telephone and the vehicular wireless telephone sharing two of the communication minutes, the predetermined number of short message units and the concierge service under the single wireless service plan,
the single wireless service plan further comprising a connectivity service for sharing information between the vehicular wireless telephone and the personal wireless telephone, the connectivity service including the downloading of stored telephone numbers from one of said vehicular wireless telephone and said personal wireless telephone to the other of said personal wireless telephone and said vehicular wireless telephone responsive to an authentication code.

9. A wireless communication system, comprising:
a first wireless telephone subscribed to receive a first call service measured by communication minutes and a second call service measured by a predetermined number of short message service messages from a first wireless service provider, the first wireless telephone being a personal wireless telephone and;
a second wireless telephone subscribed to receive a third call service comprising a concierge service from a second wireless service provider and sharing at least one service of the first, second or third call services between the first wireless telephone and the second wireless telephone, the second wireless telephone being a vehicular wireless telephone integrated into an electrical control system of a vehicle;
the first wireless telephone and the second wireless telephone sharing a single wireless service plan administered by the first wireless service provider or the second wireless service provider, and
a single billing report under the single wireless service plan, the personal wireless telephone and the vehicular wireless telephone sharing two of the communication minutes, the predetermined number of short message units and the concierge service under the single wireless service plan,
the single wireless service plan further comprising a connectivity service for sharing information between the vehicular wireless telephone and the personal wireless telephone, the connectivity service including the downloading of stored telephone numbers from one of said vehicular wireless telephone and said personal wireless telephone to the other of said personal wireless telephone and said vehicular wireless telephone responsive to an authentication code.

10. The wireless communication system recited in claim 9, wherein the second wireless telephone is subscribed to receive one or more services from a second wireless service provider comprising rerouting a call to a voice mail account of the personal wireless telephone, the call intended for receipt by the vehicular wireless telephone, the rerouting being responsive to detection that the vehicular wireless telephone is not answering the call.

11. The wireless communication system recited in claim 9, wherein
the second wireless service provider is different from the first wireless service provider; and
revenue obtained under the single wireless service plan is divided between the first wireless service provider and the second wireless service provider.

12. A wireless communication system comprising:
a first wireless telephone subscribed to receive one or more services including one of a call forwarding and a voicemail service from a first wireless service provider, the first wireless telephone being a personal wireless telephone and;
a second wireless telephone subscribed to receive one or more services including a hands-free dialing service from a second wireless service provider and sharing at least one service of the one or more services with the first wireless telephone, the second wireless telephone being a vehicular wireless telephone integrated into an electrical control system of a vehicle;
the first wireless telephone and the second wireless telephone sharing a single wireless service plan administered by the first wireless service provider or the second wireless service provider, and a single billing report under the single wireless service plan, the single wireless service plan including a connectivity service for sharing information between the vehicular wireless telephone and the personal wireless telephone;
the first wireless service provider providing a shared voicemail service with the second wireless service provider to the vehicular wireless telephone responsive to receiving a request to share a voicemail service at said first wireless service provider; and
a home location register servicing the vehicular wireless telephone indicating a sharing of the voice mail service of the personal wireless telephone with the vehicular wireless telephone, the home location register instructing a mobile switching center to reroute a call to a voice mail account of the personal wireless telephone responsive to detection of a no answer by the vehicular wireless telephone of the call.

13. A wireless communication system comprising:
a first wireless telephone subscribed to receive one or more services including one of a call forwarding and a voicemail service from a first wireless service provider, the first wireless telephone being a personal wireless telephone;
a second wireless telephone subscribed to receive one or more services including a hands-free dialing service from a second wireless service provider and sharing at least one service of the one or more services with the first wireless telephone, the second wireless telephone being a vehicular wireless telephone integrated into an electrical control system of a vehicle;
the first wireless telephone and the second wireless telephone sharing a single wireless service plan administered by the first wireless service provider or the second wireless service provider, and a single billing report under the single wireless service plan, the single wireless service plan including a connectivity service for sharing information between the vehicular wireless telephone and the personal wireless telephone, the system, upon detecting a proximity of the personal wireless telephone to the vehicular wireless telephone, re-routing a call intended for the personal wireless telephone to the vehicular wireless telephone while the vehicle of the vehicular wireless telephone is being driven, a wireless local area network communication unit of said vehicle being responsive to receipt of a proper activation code; and
a home location register servicing the vehicular wireless telephone indicating a sharing of the voice mail service of the personal wireless telephone with the vehicular wireless telephone, the home location register instructing a mobile switching center to reroute a call to a voice mail account of the personal wireless telephone responsive to detection of a no answer by the vehicular wireless telephone of the call.

14. A wireless communication system comprising:
a first wireless telephone subscribed to receive one or more services including one of a call forwarding and a voicemail service from a first wireless service provider, the first wireless telephone being a personal wireless telephone and;
a second wireless telephone subscribed to receive one or more services including a hands-free dialing service from a second wireless service provider and sharing at least one service of the one or more services with the first wireless telephone, the second wireless telephone being a vehicular wireless telephone integrated into an electrical control system of a vehicle;

a home location register servicing the vehicular wireless telephone indicating a sharing of the voice mail service of the personal wireless telephone with the vehicular wireless telephone, the home location register instructing a mobile switching center to reroute a call to a voice mail account of the personal wireless telephone responsive to detection of a no answer by the vehicular wireless telephone of the call;

the first wireless telephone and the second wireless telephone sharing a single wireless service plan administered by the first wireless service provider or the second wireless service provider, and a single billing report under the single wireless service plan;

the first wireless service provider providing a shared voicemail service with the second wireless service provider to the vehicular wireless telephone responsive to receiving a request to share a voicemail service at said first wireless service provider.

15. A wireless communication system comprising:

a first wireless telephone subscribed to receive one or more services including one of a call forwarding and a voicemail service from a first wireless service provider, the first wireless telephone being a personal wireless telephone and;

a second wireless telephone subscribed to receive one or more services including a hands-free dialing service from a second wireless service provider and sharing at least one service of the one or more services with the first wireless telephone, the second wireless telephone being a vehicular wireless telephone integrated into an electrical control system of a vehicle;

a home location register servicing the vehicular wireless telephone indicating a sharing of the voice mail service of the personal wireless telephone with the vehicular wireless telephone, the home location register instructing a mobile switching center to reroute a call to a voice mail account of the personal wireless telephone responsive to detection of a no answer by the vehicular wireless telephone of the call;

the first wireless telephone and the second wireless telephone sharing a single wireless service plan administered by the first wireless service provider or the second wireless service provider, and a single billing report under the single wireless service plan, the system, upon detecting a proximity of the personal wireless telephone to the vehicular wireless telephone, re-routing a call intended for the personal wireless telephone to the vehicular wireless telephone while the vehicle of the vehicular wireless telephone is being driven, a wireless local area network communication unit of said vehicle being responsive to receipt of a proper activation code.

16. A wireless communication system, comprising:

a first wireless telephone subscribed to receive one or more services including a voicemail service from a first wireless service provider, the first wireless telephone being a personal wireless telephone and;

a second wireless telephone subscribed to receive one or more services including a hands-free dialing service from a second wireless service provider and sharing at least one service of the one or more services with the first wireless telephone, the second wireless telephone being a vehicular wireless telephone integrated into an electrical control system of a vehicle, a home location register servicing the vehicular wireless telephone indicating a sharing of the voice mail service of the personal wireless telephone with the vehicular wireless telephone, the home location register instructing a mobile switching center to reroute a call from the personal wireless telephone responsive to the vehicular wireless telephone without requiring a storing of any portion of a signal in the personal wireless telephone after rerouting the call to the vehicular wireless telephone;

the first wireless telephone and the second wireless telephone sharing a single wireless service plan administered by the first wireless service provider or the second wireless service provider, and a single billing report under the single wireless service plan, the single wireless service plan including a connectivity service for sharing information between the vehicular wireless telephone and the personal wireless telephone.

* * * * *

UNITED STATES PATENT AND TRADEMARK OFFICE
CERTIFICATE OF CORRECTION

PATENT NO. : 7,457,608 B2  Page 1 of 1
APPLICATION NO. : 09/971080
DATED : November 25, 2008
INVENTOR(S) : Hitesh Shah It is certified that error appears in the above-identified patent and that said Letters Patent is hereby corrected as shown below:

Title Page, Item (63), please replace "60/691,800" with --09/691,800--
Title Page, Item (56) under Foreign Patent Documents, please replace "EP 1 014 338 A2 6/2000" with --EP 1 014 339 A2 6/2000--

Signed and Sealed this

Twenty-seventh Day of January, 2009

JOHN DOLL
*Acting Director of the United States Patent and Trademark Office*